United States Patent
Hansen et al.

(10) Patent No.: US 6,834,216 B2
(45) Date of Patent: Dec. 21, 2004

(54) METHOD AND APPARATUS FOR THE AUTOMATIC SYNCHRONIZATION OF DYNAMIC ANGULAR AND TIME DOMAIN CONTROL SYSTEMS

(75) Inventors: John P. Hansen, Austin, TX (US);
Ronald W. Stence, Austin, TX (US);
Stan B. Ostrum, Austin, TX (US);
Alan Michael Rooke, Northville, MI (US); Pascal Louis Renard, Vetraz-Monthoux (FR)

(73) Assignee: Freescale Semiconductor, Inc., Austin, TX (US)

( * ) Notice: Subject to any disclaimer, the term of this patent is extended or adjusted under 35 U.S.C. 154(b) by 52 days.

(21) Appl. No.: 10/022,013

(22) Filed: Dec. 13, 2001

(65) Prior Publication Data

US 2003/0114939 A1 Jun. 19, 2003

(51) Int. Cl.[7] .......................... G05B 19/18; F02D 45/00
(52) U.S. Cl. ...................... 700/275; 701/102; 701/105; 700/8; 123/406.18
(58) Field of Search ............................ 700/1, 8, 275, 700/7; 701/101, 102, 105, 115–116; 123/406.12, 406.18

(56) References Cited

U.S. PATENT DOCUMENTS

| | | | |
|---|---|---|---|
| 3,644,840 A | * 2/1972 | Conner | 331/1 A |
| 3,816,717 A | * 6/1974 | Yoshida et al. | 235/150.21 |
| 4,152,655 A | 5/1979 | Przybyla et al. | |
| 4,175,507 A | * 11/1979 | Kawai et al. | 123/406.63 |
| 4,241,708 A | 12/1980 | Javeri | |
| 4,262,251 A | 4/1981 | Fujishiro et al. | |
| 4,321,580 A | 3/1982 | Deleris | |
| 4,338,813 A | 7/1982 | Hunninghaus et al. | |
| 4,338,903 A | 7/1982 | Bolinger | |
| 4,378,004 A | 3/1983 | Petrie | |
| 4,385,605 A | 5/1983 | Petrie et al. | |
| 4,485,784 A | 12/1984 | Fujii et al. | |
| 4,494,509 A | 1/1985 | Long | |
| 4,494,518 A | 1/1985 | Katayama et al. | |
| 4,553,208 A | 11/1985 | Akiyama et al. | |
| 4,572,151 A | 2/1986 | Toyama | |
| 4,618,930 A | * 10/1986 | Ueno et al. | 364/426 |
| 4,626,682 A | 12/1986 | Hara et al. | |
| 4,814,704 A | 3/1989 | Zerrien, Jr. et al. | |
| 4,960,092 A | * 10/1990 | Sasaki et al. | 123/414 |
| 5,317,614 A | * 5/1994 | Davis et al. | 377/17 |
| 5,732,381 A | * 3/1998 | Guido et al. | 701/104 |
| 5,829,412 A | * 11/1998 | Klatt et al. | 123/500 |
| 6,473,687 B2 | * 10/2002 | Ando | 701/114 |

OTHER PUBLICATIONS

Hitachi, Ltd., SH7055 Hitachi Hardware Manual, Section II Advanced Timer Unit–II (ATU–II), Rev. Jan. 9, 1998, pp. 185–364.
Motorola, Inc., M68300 Family, TPU Time Processor Unit Reference Manual, pp. 1–1 to 3–124 (1990).

* cited by examiner

Primary Examiner—Leo Picard
Assistant Examiner—Sean Shectman

(57) ABSTRACT

A hardware system is provided for performing angle-to-time and time-to-angle conversions in a dynamic angular measurement and control system. The system has the capability of updating scheduled event times of other hardware timers in the system that are being used to generate output events at some specific angular position in the future. One application of the system is in automotive powertrain control systems in which the position of the engine is determined from a pulsed signal generated by a rotating crankshaft that accelerates and decelerates over time. The system performs critical calculations in hardware which consumes less CPU bandwidth than existing systems, resulting in potential cost savings for the overall system.

17 Claims, 4 Drawing Sheets

METHOD AND APPARATUS FOR THE AUTOMATIC SYNCHRONIZATION OF DYNAMIC ANGULAR AND TIME DOMAIN CONTROL SYSTEMS

FIELD OF THE INVENTION

The present invention relates to the synchronization of dynamic angular and time domain control systems, and in particular, to a hardware-based system for performing angle-to-time and time-to-angle conversions in a dynamic angular measurement and control system.

RELATED ART

When measuring the angular position of a rotating object via a periodic input that represents a rotation of a fixed number of degrees, it is often desirable to increase the resolution of the system by interpolating between inputs. If the angular velocity of the object is changing dynamically, the relationship between angle and time also changes, and the interpolation algorithm must be performed for each new input that is received.

In the example of automotive powertrain control systems, there is a relationship between the angle of the crank shaft and the time between angles as the crankshaft rotates. The normal operation of a 4-cycle engine repeats itself every two revolutions of the crankshaft, or every 720θ. Various events (e.g., opening or closing valves, generating sparks, injecting fuel, etc.) are desired to be triggered at time offset from a certain angular position. For example, it may be desired to trigger an event 10 ms (milliseconds) prior to an angle of 60θ. The control system then has to make a determination as to when 10 ms prior to 60θ occurs.

Typical prior art control systems rely upon the execution of software algorithms to perform these conversions. There are various problems with prior art control systems. For example, the software algorithms require significant CPU (central processing unit) computing and interrupt processing bandwidth. In addition there are delays in making the required determinations caused by CPU loading of other tasks and interrupt latency. Another problem is that the accuracy is limited in prior art systems.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status.

Generally, the present invention provides a hardware method and apparatus for performing conversions between two domains, for example angle-to-time and time-to-angle conversions in a dynamic angular measurement and control system. In addition, the invention has the capability of updating scheduled event times of other hardware timers in the system that are being used to generate output events at some specific angular position in the future.

One example of an application of the invention is in automotive powertrain control systems in which the position of the engine is determined from a pulsed signal generated by a rotating crankshaft that accelerates and decelerates over time. As mentioned above, traditionally, the interpolation of angular position between the pulses is performed in software calculations that consume significant CPU computing and interrupt processing bandwidth. The invention moves these calculations into hardware which consumes less CPU bandwidth, resulting in potential cost savings for the overall system. The invention also provides an improvement in the angular accuracy (by approximately three times) of output event placement. Other advantages of the present invention include greater ease of use and reduced latency in responding to changes in RPM (revolutions per minute).

The invention will be described in the context of an engine control system. However, it should be understood that the invention can be applied to any system which requires the synchronization of dynamic and multi-domain systems.

Figure 1:
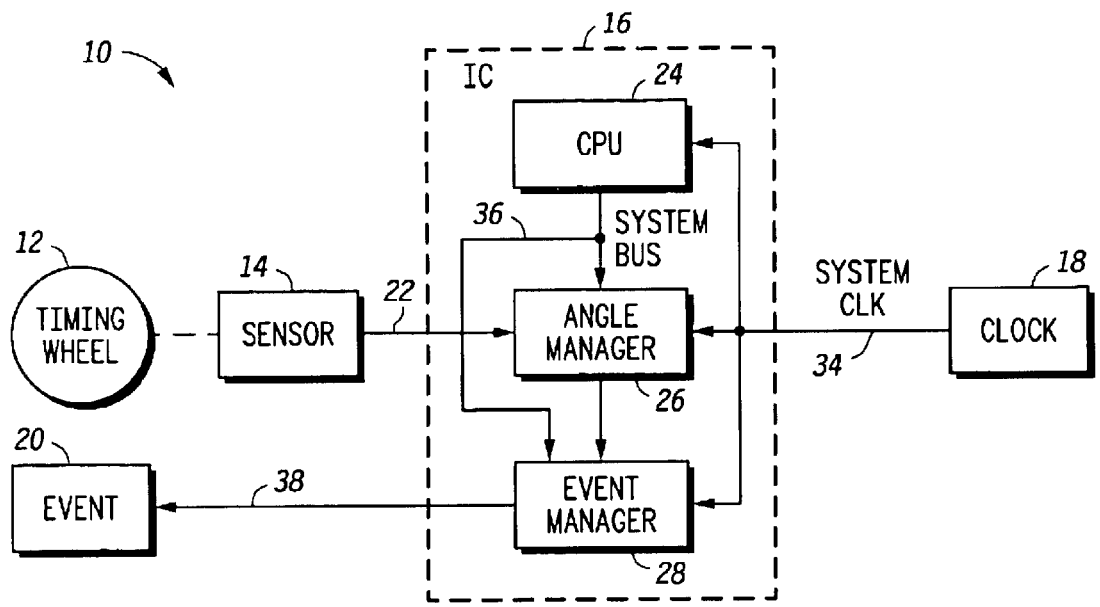
FIG. 1 is a block diagram of an angular time-based system.

FIG. 1 is a block diagram illustrating an angular time-based system 10 of the present invention. The system 10 is shown with a timing wheel 12 which is mechanically coupled to an engine. A typical timing wheel 12 includes a plurality of teeth spaced around the periphery of the wheel 12. As the timing wheel 12 rotates with the engine, a sensor 14 senses the passage of each of the teeth. The sensor 14 generates a signal 22 which is indicative of the wheel position, and thus, the engine position. The purpose of the signal 22 is to provide a reference to keep the system in synchronization with the mechanical system. Each tooth of the wheel 12 may correspond to a fixed number of degrees (X degrees), such that the signal 22 will include a pulse whenever the wheel 12 rotates X degrees. In this example, the wheel would include 360/X teeth spread equally around the periphery of the wheel. In most engines today the number of degrees per tooth ranges from 1 degree per tooth up to 60 degrees per tooth. However, alternate embodiments may use any number of degrees per tooth. A typical timing wheel 12 may have one or two missing teeth or an additional tooth which provides a reference for the position of the wheel.

FIG. 1 also shows an integrated circuit (IC) 16 which includes a microprocessor or CPU 24, an angle manager 26, and an event manager 28. Note that the CPU 24 may also be external to the IC 16. Also note that a typical system may include a plurality of event managers to trigger a plurality of events. Exemplary events may include the opening and closing of valves, initiating a spark, activating a pump, etc. For the purposes of clarity, only one event manager 28 and one event 20 are shown. The angle manager 26 and event manager 28 are coupled to the CPU 24 via a system BUS 36. The CPU 24, angle manager 26, and event manager 28 all receive a system clock signal 34 from a clock 18. The angle manager 26 receives the signal 22 from the sensor 14 and provides information to the event manager 28. The event manager 28 generates an output 38 which is correlated to the position of the engine at a designated time. The output 38 is used to trigger an event 20.

Figure 2:
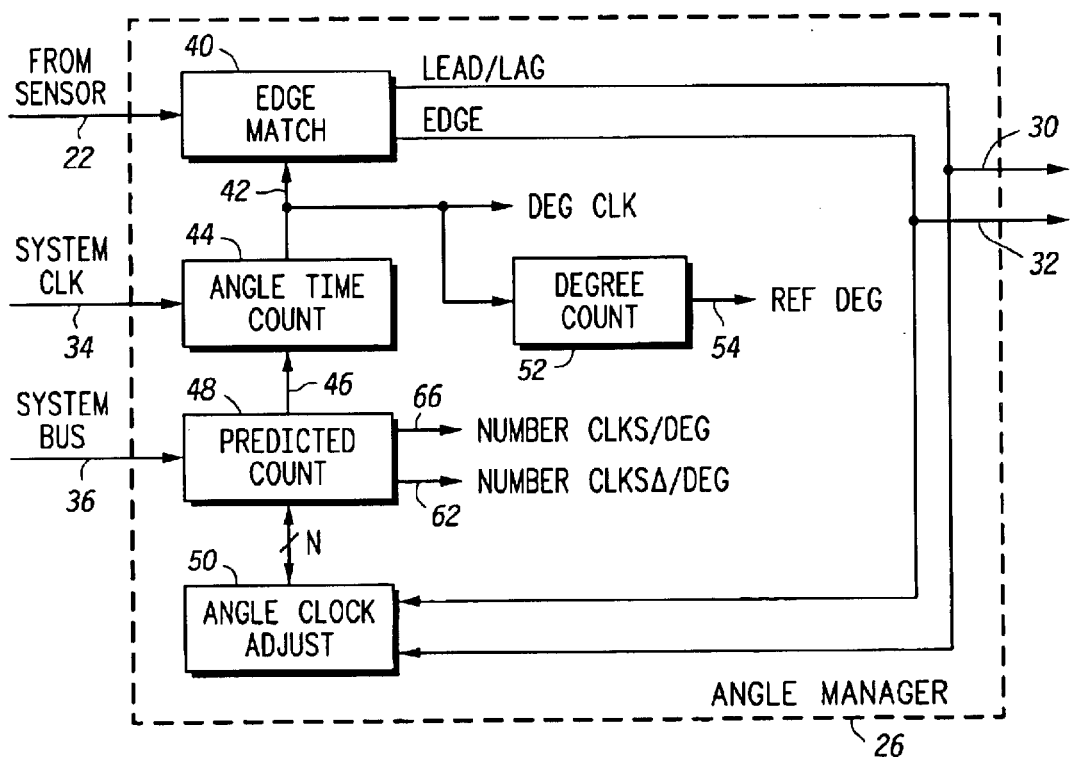
FIG. 2 is a block diagram of the angle manager shown in FIG. 1.

FIG. 2 is a block diagram of the angle manager 26 shown in FIG. 1. The angle manager 26 includes an edge match block 40 which receives the signal 22 from the sensor 14. As mentioned above, the signal 22 is generated in response to the passage of a tooth on the timing wheel 12 which is attached to the crankshaft. Therefore, each pulse in the signal 22 will correspond to the passage of a tooth on the timing wheel 12 past the sensor 14. The edge match block 40 compares the signal 22 to a degree clock signal 42 and determines whether the predicted count (described below) leads or lags the pulse from the sensor 14. In response to the comparison between the signal 22 and the degree clock signal 42, the edge match block 40 generates a lead/lag signal 30 which indicates whether the degree clock signal 42 leads or lags the actual signal 22 from the sensor 14. For example, if the appropriate pulse from the degree clock signal 42 leads the pulse from the signal 22, then the lead/lag signal 30 will indicate a lead. Similarly, if the appropriate pulse from the degree clock signal 42 lags the pulse from the signal 22, then the lead/lag signal 30 will indicate a lag. The edge match block 40 also generates an edge signal 32 which indicates that an edge has been sensed by the sensor 14 (i.e., the edge signal 32 indicates when a tooth on the wheel 12 passes the sensor 14).

FIG. 2 also shows an angle time count block 44 which receives the system clock signal 34 and a signal 46 from the predicted count block 48 and generates the degree clock signal 42. The purpose of the angle time count block 44 is to take the signal 46 (the number of clock cycles per degree) and generate the degree clock signal 42 such that each pulse in the degree clock signal 42 represents a number of degrees or fractional degrees between each pulse in the signal 22. In other words, the angle time count block 44 takes the predicted count and generates a signal where each pulse in the signal represents the passage of one degree of the timing wheel 12 between pulses of the signal 22. Note that the pulses of the degree clock signal 42 may correspond to the passage of one degree, multiple degrees, or fractional degrees. In the example where teeth of the timing wheel 12 are separated by 20°, and where the resolution of the degree clock signal 42 is one degree, the angle time count block 44 will generate 20 pulses for each pulse in the signal 22. In this example, the 20$^{th}$ pulse of the degree clock signal 42 is the pulse that the edge match block 40 compares to the signal 22 to determine the occurrence of a lead or lag.

The degree clock signal 42 is also coupled to a degree count block 52 which is a counter used to generate a reference degree signal 54. In the example of a 4-cycle engine, 720° represents one complete cycle of the engine. Therefore, in this example, the degree count block 52 would count from 0° to 720° and generate the reference degree signal 54 which would indicate where in the 720θ cycle the engine is currently at in the rotation. Note that in other applications, a complete cycle may use different numbers of degrees, for example, 360°, 1440°, etc.

Figure 3:
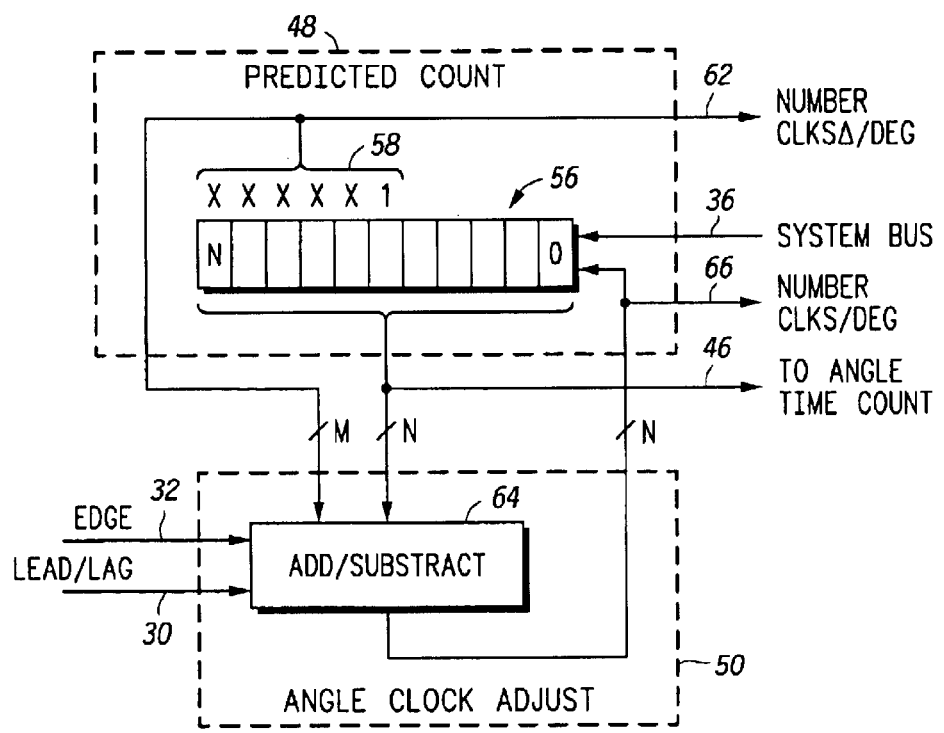
FIG. 3 is a block diagram of the angle clock adjust and predicted count shown in FIG. 2.

FIG. 2 also shows a predicted count block 48 and an angle clock adjust block 50 which are described in detail with respect to FIG. 3. The predicted count block 48 contains a value relating to the number of system clock pulses per degree. The predicted count block 48 also contains information relating to the change in system clock pulses per degree. At the passage of each tooth in the timing wheel 12 (i.e., each pulse in the signal 22) the angle clock adjust block 50 makes an adjustment to the information in the predicted count block 48 in order to maintain the accuracy of the degree clock signal 42.

FIG. 3 is a block diagram of the predicted count block 48 and angle clock adjust block 50 shown in FIG. 2. The predicted count block 48 includes an N-bit register 56. The N-bit register 56 includes a first portion 58 containing the most significant bits of the register 56. The number of bits M in the first portion 58 may vary depending on the application in which the invention is implemented. A second portion 46 of the register 56 contains all of the bits in the register 56. The value of the bits in the first portion 58 of the register 56 defines a value which relates to the number of clock cycles changed per degree. This value is used as the number of clock signals per degree in which the predicted count is adjusted. A signal corresponding to the value will be referred to as NUMBER CLKSΔ/DEG signal 62, or #CLKSΔ/DEG signal 62. The M-bits in the first portion 58 of the register 56 are provided to add/subtract circuitry 64. In addition, the N-bits from the second portion 46 of the register 56 are also provided to the add/subtract circuitry 64. The add/subtract circuitry 64 also receives the lead/lag signal 30 as well as the edge signal 32. When the add/subtract circuitry 64 receives an edge signal 32, an adjustment is made to the value in the register 56. If the signal 30 indicates a lead (for example when the degree clock signal 42 leads the signal 22 from the sensor 14), then the add/subtract circuitry 64 increases the value in the register 56 by adding the first portion 58 to the second portion 46 of the register 56. In other words, the most significant bits of the register 56 are added to the entire value in the register 56. If the signal 30 indicates a lag (for example when the degree clock signal 42 lags the signal 22 from the sensor 14), then the add/subtract circuitry 64 subtracts the value of the first portion 58 from the value in the register 56. The result of the addition or subtraction described above is provided back to the register 56 as a signal 66 representing an updated number of clock cycles per degree, referred to as NUMBER CLKS/DEG 66, or #CLKS/DEG 66. In this way, the number of clock signals per degree is dynamically updated based on information from the edge match block 40.

The size of M (i.e. the number of bits in the first portion 58 of the register 56) is constant for any given application. However, the value of M can be varied depending on the requirements of the system. The value of M provides a scaling mechanism in which a larger value of M allows larger adjustments to be made to the signal 66 relating to the number of clocks per degree. If the number of clocks per degree is very large (i.e. the value of N is large), then the value of M will be large and the amount by which the system adjusts the number of clocks per degree is relatively large. Similarly, when N is small, M will also be smaller. This feature helps to make fast adjustments to the number of clocks per degree. Note that the least significant bit of the first portion 58 will always be set to "1" so that the predicted count will always be adjusted by some amount.

Figure 4:
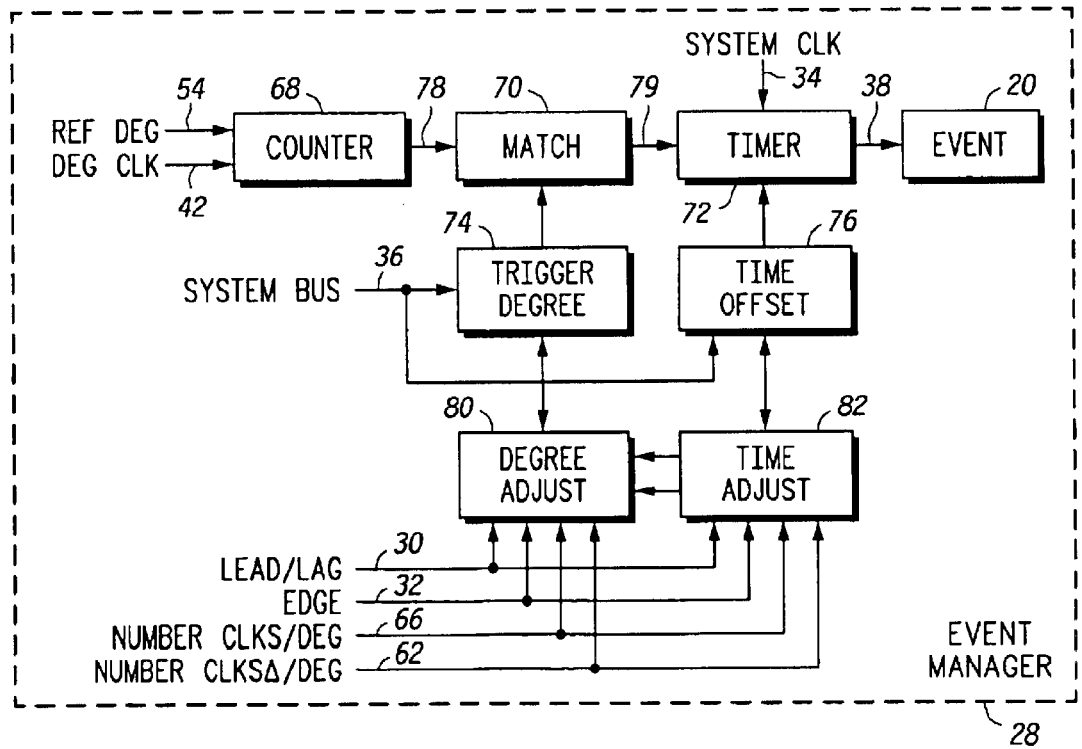
FIG. 4 is a block diagram of the event manager shown in FIG. 1.

FIG. 4 is a block diagram of the event manager 28 shown in FIG. 1. The function of the event manager 28 is to trigger one or more events at a predetermined time relative to the position of the engine. For example, it may be desired to trigger an event at 10 ms before 60θ. In order to trigger this event, the event manager 28 must determine when 10 ms before 60θ is. In this example, it will be assumed that 10 ms is equal to 500 system clock cycles. This number will remain constant since the system clock is constant. The event time can then be thought of as occurring 500 clock cycles before 60θ. This example will also assume that there are 120 clock signals per degree (#CLKS/DEG). Note that this value will change over time as the speed of the crankshaft rotation varies. The event time (10 ms before 60θ) must be converted into a time after a degree. By subtracting 120 clock cycles and one degree, the event time is converted to 380 clock cycles before 59θ. Additional similar conversions convert the event time to 100 clock cycles after 55θ. Note that, under the assumptions above, 100 clock cycles after 55θ is the same as 500 clock cycles prior to 60θ. In order for this methodology to work properly, the number of clocks per degree must be continually adjusted to ensure accuracy.

As mentioned above, the event manager 28 is coupled to the system BUS 36 as well as to various signals from the angle manager 26. Inputs to the event manager 28 include the reference degree signal 54 and the degree clock signal 42. A counter 68 receives the signals 54 and 42 and generates an output 78 which is received by a match circuit 70. The output 78 of the counter 68 provides an indication of what angle the system is currently at. The match circuit 70 compares the present angle of the system and a trigger degree angle related to the triggering of an event. A trigger degree block 74 includes a register which stores a value of a degree at which a desired event is triggered. In the example described above, a value relating to 55θ would be stored in the trigger degree block 74. When a match occurs (i.e. the system is at 55θ), the match circuit 70 provides a signal 79 to the timer 72. The timer 72 also receives an offset value from time offset block 76. The time offset block 76 includes a register which stores a value relating to a number of system clock cycles (in the example above, 100 clock cycles). The output 38 is generated by the timer 72 to trigger the event 20. The event 20 is triggered after the occurrence of the degree stored in the trigger degree block 74, and after the number of system clock cycles stored in the time offset block 76 has lapsed. In the example above, the event 20 will be triggered 100 clock cycles after 55θ. Note that matching to a trigger (as shown for degrees) and counting down to zero (as shown for time), can be exchanged as desired for a more efficient circuit.

As mentioned above, the degree clock signal 42 must be adjusted frequently in order to maintain the accuracy of the system. FIG. 4 shows degree adjust block 80 and time adjust block 82 which provide any necessary adjustments to the trigger degree block 74 and time offset block 76 based on adjustments made to the predicted count block 48. For example, if the number of clock cycles per degree increases, the time offset and trigger degree need to be adjusted accordingly (described below). The degree adjust block 80 and time adjust block 82 receive lead/lag signal 30, edge signal 32, #CLKS/DEG signal 66, and #CLKSΔ/DEG signal 62.

Figure 5:
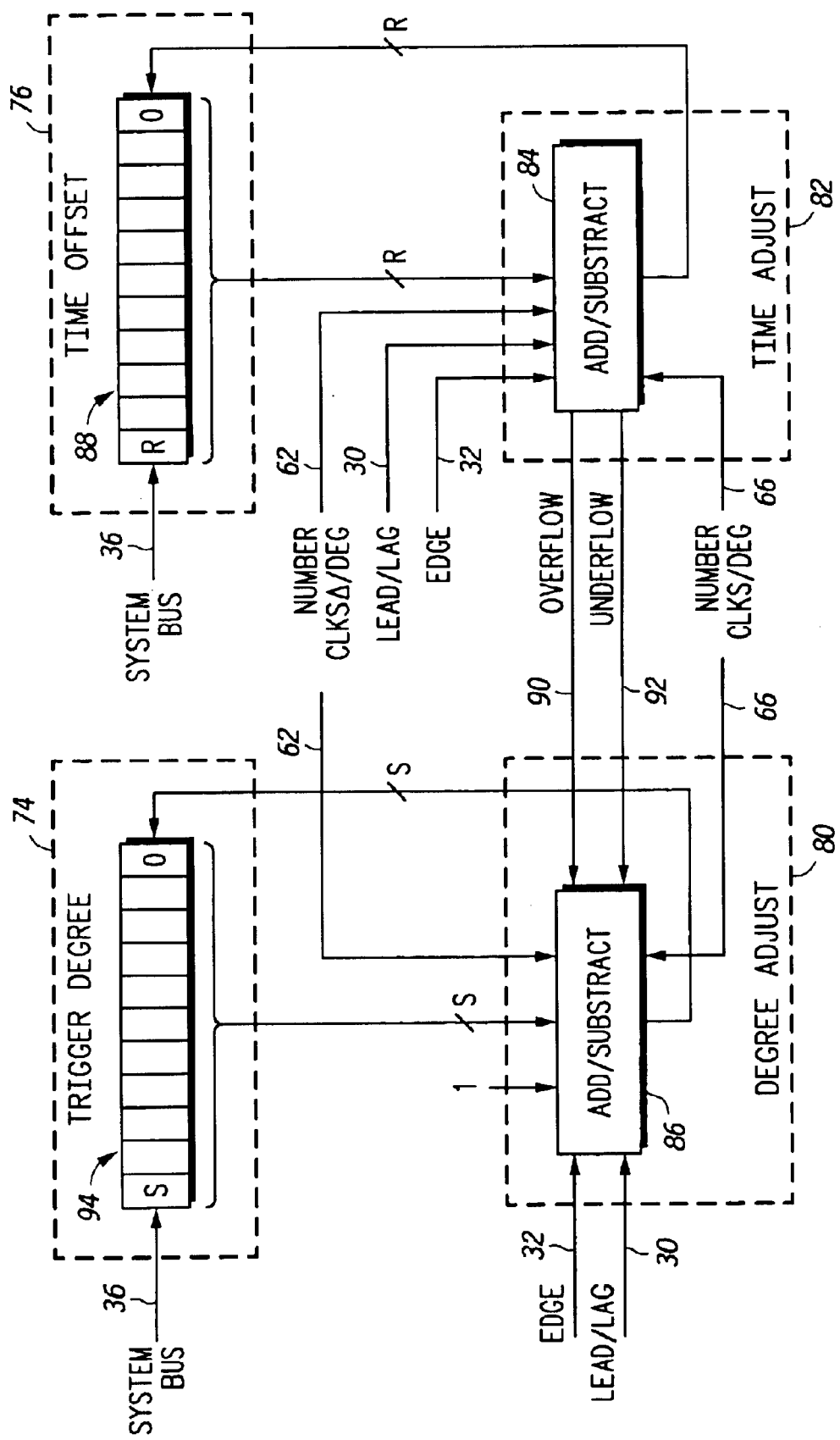
FIG. 5 is a diagram illustrating the time offset, time adjust, trigger degree, and degree adjust blocks shown in FIG. 4.

FIG. 5 is a block diagram of the trigger degree block 74, time offset block 76, degree adjust block 80, and time adjust block 82. FIG. 5 illustrates how the trigger degree block 74 and time offset block 76 are adjusted as the predicted count is adjusted. The time adjust block 82 includes add/subtract circuitry 84. Similarly, the degree adjust block 80 include add/subtract circuitry 86. The add/subtract circuitry 84 and 86 each receive as inputs the #CLKSΔ/DEG signal 62, lead/lag signal 30, the edge signal 32, and the #CLKS/DEG signal 66. The add/subtract circuitry 84 also receives the value of a register 88 of the time offset block 76. The register 88 is an R-bit register which contains the value of the time offset (e.g., 100 in the example above). Each time that an edge signal 32 is received, the add/subtract circuitry 84 will add or subtract the value of #CLKSΔ/DEG to the value of the register 88 depending on the value of the lead/lag signal 30. If the lead/lag signal 30 indicates a lead, then the value in the register 88 is added to the value of the #CLKSΔ/DEG signal 62. The sum is provided back to the register 88 to update the time offset block 76. In the case where the value of the updated time offset is greater than or equal to the value of #CLKS/DEG (an overflow), an overflow signal 90 is generated which instructs the add/subtract circuitry 86 to add a degree (described below). At the same time, #CLKS/DEG is subtracted from the updated time offset. If the lead/lag signal 30 indicates a lag, then the value of the #CLKSΔ/DEG signal 62 is subtracted from the value in the register 88. The difference is provided to the register 88 as an updated time offset. If the updated time offset is negative (an underflow), then an underflow signal 92 is provided to the add/subtract circuitry 86 instructing it to subtract a degree. Next, the #CLKS/DEG is added to the remainder, resulting in an updated time offset.

As mentioned above, the add/subtract circuitry 86 adds or subtracts an amount corresponding to 1 degree to/from the value in a register 94 of the trigger degree block 74 if an overflow or underflow signal 90 or 92 is received. In other words, if an overflow signal 90 is received, one degree is added to the value in register 94, and if an underflow signal 92 is received, one degree is subtracted from the value in register 94. In addition, the value of the offset is adjusted so that it is greater than or equal to zero and less than #CLKS/DEG.

Figure 6:
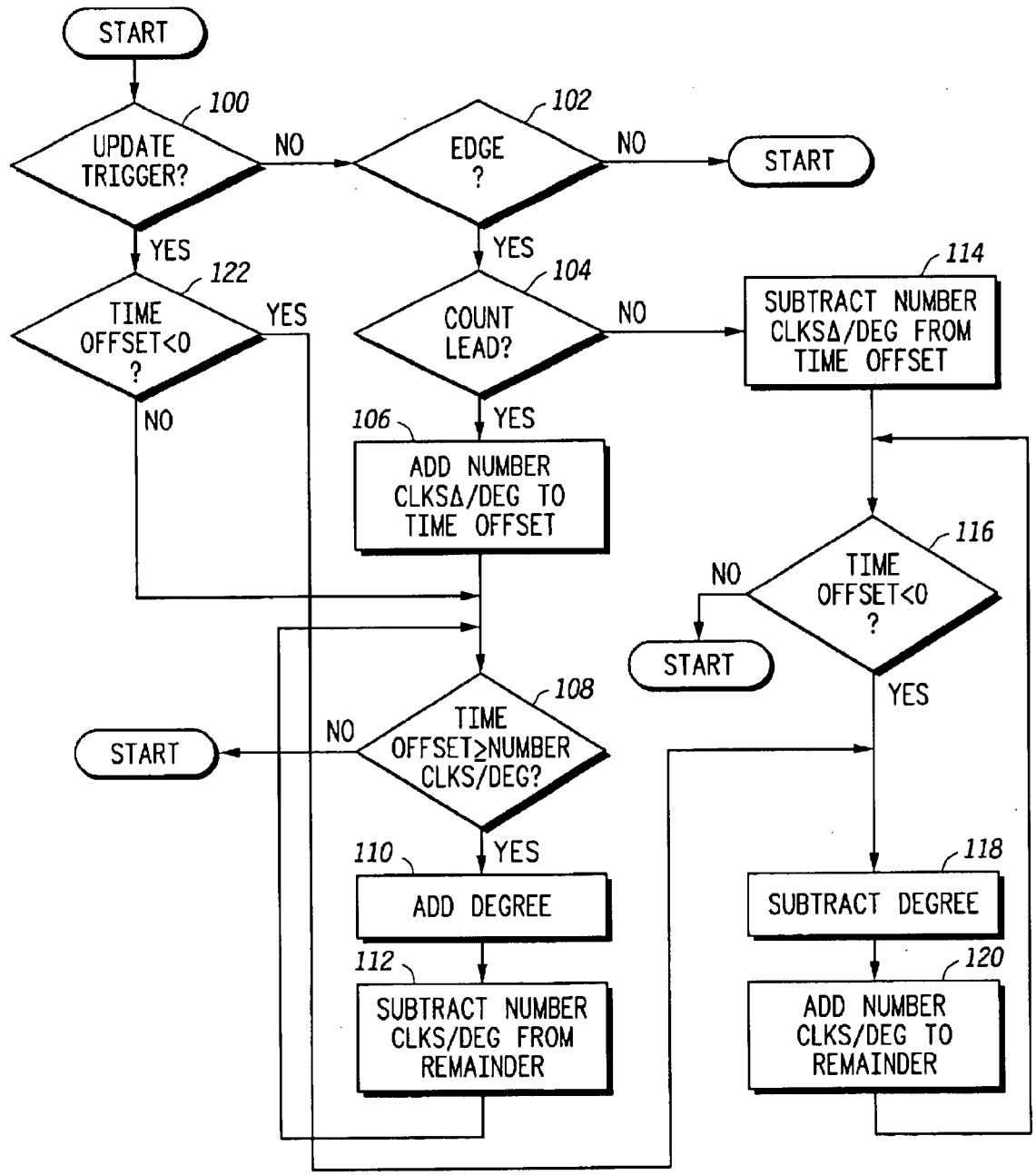
FIG. 6 is a flow chart illustrating the operation of the time adjust and trigger degree blocks shown in FIG. 4.

FIG. 6 is a flow chart illustrating the operation of the degree adjust block 80 and time adjust block 82 shown in FIG. 5. The flow chart of FIG. 6 will be described in conjunction with various specific examples. In a first example, the following assumptions are made: #CLKS/DEG is 200, trigger degree is 55θ, time offset is 100 system clock cycles, and #CLKSΔ/DEG is 120. Note that for some embodiments of the present invention, the #CLKSΔ/DEG value is always an odd number as the binary value of #CLKSΔ/DEG always ends in one. However, setting #CLKSΔ/DEG equal to an even number in these examples is for illustrative purposes only; other values of #CLKSΔ/DEG could have been chosen. The process begins with step 100. At step 100, the process asks whether an update trigger has occurred. An update trigger is a flag indicating that the trigger degree block or time offset block has been updated. If not, the process proceeds to step 102 which asks whether an edge is received (edge signal 32). If no edge is received, the process starts over. When an edge is received, the process proceeds to step 104 which asks whether the predicted count resulted in a lead or lag (lead/lag signal 30). If the predicted count resulted in a lead, the process proceeds to step 106. At step 106, the #CLKSΔ/DEG (120) is added to the time offset (100). In this example, the result is an updated time offset of 220. At step 108, the process asks whether the updated time offset (220) is greater than or equal to the #CLKS/DEG (200). If not, the process would start over. In this example, the time offset is greater than the #CLKS/DEG and the process proceeds to step 110. At step 110, one degree is added to the register 94 via add/subtract circuitry 86, resulting in an updated trigger degree of 56θ. Next, at step 112, the #CLKS/DEG (200) is subtracted from the remainder (220). The result of the subtraction in this example is 20. The process then proceeds again to step 108. Since the time offset (20) is less than the number of #CLKS/DEG (200), the process starts over. In this first example, the event initially was triggered at 100 clock cycles after 55θ. After the update process, the event will be triggered at 20 clock cycles after 56θ.

In a second example, using the same assumptions, where the predicted count results in a lag, the process proceeds from step 104 to step 114. At step 114, the #CLKSΔ/DEG (120) is subtracted from the time offset (100). This results in an updated time offset of −20. The process then proceeds to step 116 which asks whether the time offset is negative. If not, the process would proceed to start. If the time offset is negative, the process proceeds to step 118 where a degree is subtracted from the register 94 of the trigger degree block 74, resulting in an updated trigger degree of 540. At step 120, the #CLKS/DEG (200) is added to the remainder (−20) resulting in 180. The process then proceeds to step 116 again. At step 116, the process will proceed to start since the time offset is now 180, which is greater than zero. If the time offset would have still been negative, the process would proceed to step 118. After the update process, the event will be triggered at 180 clock cycles after 540. In both instances, the event will triggered at a desired time (e.g. 10 ms prior to 60θ).

A third example makes the same assumptions except with a #CLKSΔ/DEG of 20 as opposed to 120. The process proceeds the same as before up to step 104. At step 104, the process asks whether the lead/lag signal 30 indicates a lead or a lag. If the signal 30 indicates a lead, the process proceeds to step 106. At step 106, the #CLKSΔ/DEG (20) is added to the time offset (100) resulting in 120 as an updated time offset. At step 108, the process asks whether the time offset (120) is greater than or equal to the #CLKS/DEG (200). In this example, the results of step 108 is no and the process proceeds to start. In this example, after the update process, the event will be triggered at 120 clock cycles after 55θ. If the lead/lag signal 30 indicates a lag, the process proceeds from step 104 to step 114. At step 114, the #CLKSΔ/DEG (20) is subtracted from the time offset (100) resulting in 80. The process proceeds to step 116 or the process asks whether the updated time offset (80) is less than zero. In this example, the result of step 116 is no and the process proceeds to start. In this example, after the update process, the event will be triggered at 80 clock cycles after 55θ.

In a fourth example, the same assumptions apply as did for the first two examples. In addition, the fourth example assumes that the time offset is updated by the software running on the CPU. Examples of why the software may update the time offset includes adjustments as a result of changes in RPM, engine loading, fuel mixture, pre-ignition or knock, etc. In this example, the time offset is updated to be −80 rather than 100. At step 100, the process asks whether an update trigger has been received. In this example, the result of step 100 is yes and the process proceeds to step 122. At step 122, the process asks whether the time offset (−80) is less than zero. In this example, the result of step 122 is yes and the process proceeds to step 118 where a degree is subtracted from the register 94. The process proceeds to step 120 where the #CLKS/DEG (200) is added to the remainder (−80) resulting in 120. The process then proceeds to step 116 where the process asks whether the new time offset (120) is less than zero. If so, the process proceeds to step 118. If not, the process proceeds to start. In this example, after the update process, the event will be triggered at 120 clock cycles after 54θ.

In a fifth example, the same assumptions above are made except that the time offset is updated by the software to be 220. At step 100, the process asks whether an update trigger was received. In this example, the result of step 100 is yes and the process proceeds to step 122. At step 122, the process asks whether the time offset (220) is less than zero.

In this example, the result of step 122 is no and the process proceeds to step 108. At step 108, the process asks whether the time offset (220) is greater than or equal to the #CLKS/DEG (200). In this example, the result of step 108 is yes and the process proceeds to step 110 where a degree is added to the register 94 of the trigger degree block 74 resulting in a new trigger degree of 56θ. The process then proceeds to step 112 where the #CLKS/DEG (200) is subtracted from the remainder (220) resulting in 20. The process then proceeds back to step 108. In this example, the time offset (20) is less than the #CLKS/DEG (200) and the process proceeds to start. In this example, after the update process, the event will be triggered at 20 clock cycles after 56θ.

In a sixth example the same assumptions are used as were used in the fifth example except that the time offset is updated by the software to be 110. At step 100, the process asks whether an update trigger has been received. In this example, the result of step 100 is yes and the process proceeds to step 122. At step 122, the process asks if the time offset (110) is less than zero. In this example, the result of step 122 is no and the process proceeds to step 108. At step 108 the process asks whether the time offset (110) is greater than or equal to the #CLKS/DEG (200). In this example, the result of step 108 is no and the process proceeds to start.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A domain control system comprising:
   a first manager comprising first logic, the first logic, responsive to a first signal, to provide a second signal representative of a first domain and a third signal representative of the first domain and a second domain; and
   a second manager comprising second logic coupled to the first logic, the second logic, responsive to the second and third signals, to operate on a first value representative of the first domain and on a second value representative of the second domain, and to provide a fourth signal to control an event defined by the first and second values, the first and second values.
   wherein the first logic adjusts the second signal according to a magnitude of the third signal.

2. A domain control system according to claim 1 wherein the first logic adjust the second signal according to the magnitude of the third signal without requiring intervention by a processor.

3. A domain control system according to claim 1 wherein the first logic comprises:
   a register to hold the third signal as a plurality of bits; and
   add/subtract logic coupled to the register, the add/subtract logic to increase or decrease the magnitude of the third signal by most significant ones of the plurality of bits.

4. A domain control system according to claim 1 wherein the second logic comprises:
   a first register to store the first value;
   a second register to store the second value; and
   add/subtract logic coupled to the first and second registers, the add/subtract logic, responsive to a fifth signal, to adjust the first and second values.

5. A domain control system according to claim 4 wherein the add/subtract logic adjusts the first value by a fixed amount and adjusts the second value by a variable amount.

6. A domain control system according to claim 4 wherein the add/subtract logic adjusts the second value based on the fifth signal and adjusts the first value based on the adjusted second value.

7. A domain control system according to claim 4 wherein the first register has a first capacity set by the first domain, and the second register has a second capacity set by the first domain and the second domain.

8. A domain control system according to claim 7 wherein the first domain is angular, and the first capacity is set by one of a plurality less than one degree.

9. A domain control system comprising:
   a first manager comprising first logic, the first logic, responsive to a first signal, to provide a second signal representative of a first domain and a third signal representative of the first domain and a second domain; and
   a second manager comprising second logic coupled to the first logic, the second logic, responsive to the second and third signals, to operate on a first value representative of the first domain and on a second value representative of the second domain, and to provide a fourth signal to control an event defined by the first end second values,
   wherein the second value is less than a product of the first value and the third signal.

10. A domain control system according to claim 1 wherein the first domain is angular and the second domain is time.

11. A method comprising:
    providing a first signal;
    in response to the first signal, providing a second signal representative of a first domain and providing a third signal representative of the first domain and a second domain;
    in response to the second and third signals, operating on a first value representative of the first domain and on a second value representative of the second domain;
    providing a fourth signal to control an event defined by the first and second values; and
    adjusting the second signal according to a magnitude of the third signal.

12. A method as in claim 11 wherein the first domain is angular.

13. A method as in claim 12 wherein the second domain is time.

14. A method as in claim 11 wherein said step of adjusting is performed without requiring intervention by a processor.

15. A method as in claim 11 wherein the method is used to perform a conversion between the first and second domains.

16. A method as in claim 11 wherein the first domain represents crankshaft position.

17. A method as in claim 16 wherein the method is used in an engine control system.

* * * * *